Figure 5:
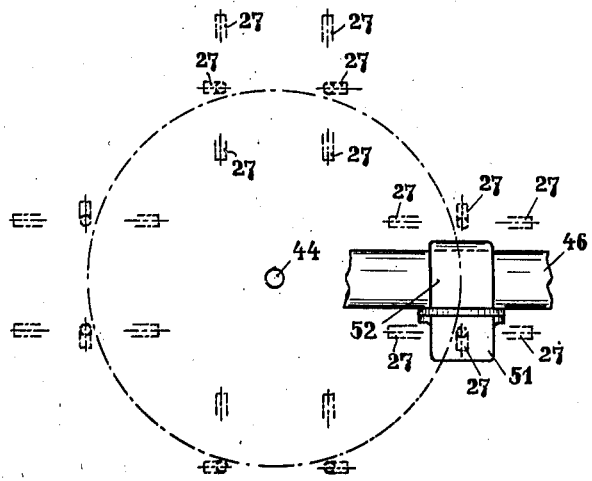

Feb. 9, 1943.  V. RETTERATH  2,310,870
RADIAL DRILLING MACHINE
Filed April 8, 1940  3 Sheets-Sheet 1
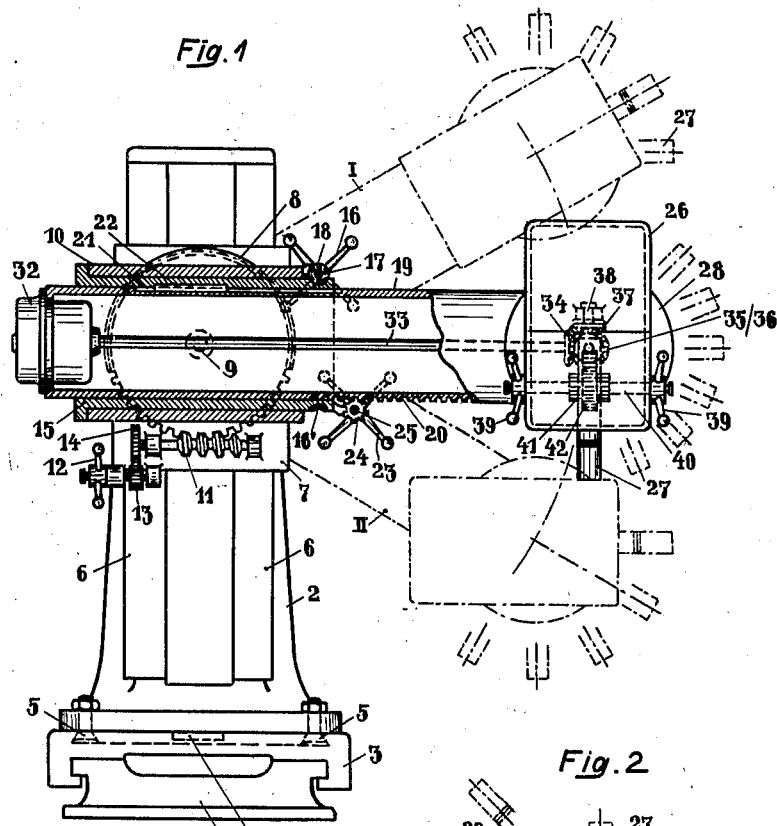
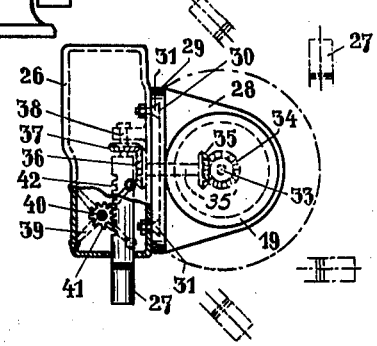

Feb. 9, 1943.    V. RETTERATH    2,310,870
RADIAL DRILLING MACHINE
Filed April 8, 1940    3 Sheets-Sheet 2
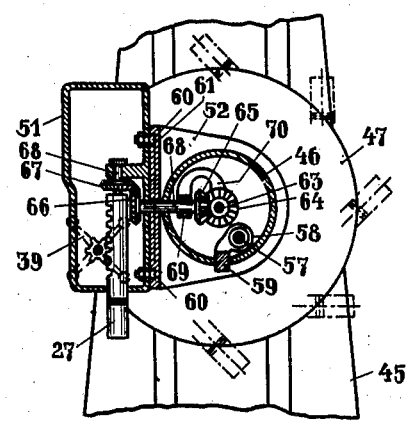
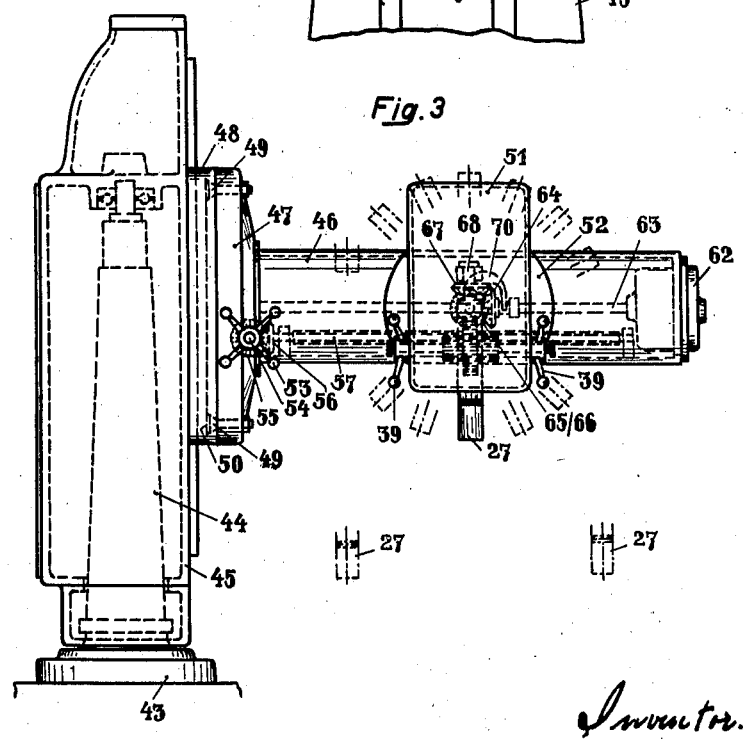

Patented Feb. 9, 1943

2,310,870

UNITED STATES PATENT OFFICE 2,310,870

RADIAL DRILLING MACHINE

Valentin Retterath, Iversheim, near Munstereifel, Germany; vested in the Alien Property Custodian Application April 8, 1940, Serial No. 328,541
In Germany April 15, 1939

5 Claims. (Cl. 77—28)

This invention relates to a radial drilling machine.

In so-called universal radial drilling machines constructed either with a column or with a rotary jacket on the column the position of the drill spindle can be varied relative to the work by displacing the arm on the column or by adjusting the housing of the saddle on the arm.

The invention is applicable to both types of known radial drills and proposes to increase the adjustability of the drill spindle with respect to the work to such an extent that it complies more fully with the requirements which a truly universal radial drilling machine should meet than the known drills of this class and, furthermore, combines increased adjustability with very simple design and considerable output.

In order to attain its object the invention provides first for rotatability of the arm supporting the housing of the saddle about its longitudinal axis through 360°, so that the drill spindle, seen in the vertical plane, can occupy any desired angular position. If the machine is of the pillar type, the arm is arranged in a slide capable of moving up and down on the column in known manner and is rotatable about its longitudinal axis in the slide by means of a bushing disposed in the slide and rotatable by a worm gearing or other suitable means. If, on the other hand, the machine is fitted with a rotary jacket or shell, the arm is positioned with its inner end on the jacket and can be turned 360°, in which case the part of the housing of the saddle embracing the arm need not be swingable about the longitudinal axis of the arm but may be swung 360° about an axis disposed perpendicularly thereto, whereby angular adjustment of the drill spindle in a cylindrical area about the longitudinal axis of the arm is insured.

When the arm is rotatable 360° at its inner end located on the rotary jacket, longitudinal displacement of the drill spindle is preferably effected by displacing the housing of the saddle on the arm, whereas if the arm itself is longitudinally displaceable in a slide on the column, the housing of the saddle is rotatably but not longitudinally displaceably arranged thereon. This can be brought about by rendering the arm displaceable in a bushing or sleeve, for instance by means of a worm gearing, the sleeve being disposed in a slide capable of vertical traverse.

In the latter instance, slewability of the entire arm structure on the column can be attained by a corresponding rotary plate construction.

The column of a radial drilling machine of this type may be rotatable at its base about a vertical axis to obtain the same effect as in the known machine with rotary jacket.

It will be seen that, according to the invention, the drill spindle in radial drilling machines of both the column and rotary jacket type may practically occupy any desired position, whereby the machineability of different kinds of work is greatly facilitated.

The invention is further concerned with a particular construction of the arm and the arrangement of the driving motor for the drill spindle. According to the invention, the arm forms a hollow body having a circular cross section and containing at one end a driving motor for the drill spindle. The inside of the arm is preferably fitted with opposed spirallike reinforcing ribs.

In view of the fact that the invention provides for a greater adjustability of the drill spindle than is found in known machines, the operating elements for displacing the spindle are preferably disposed on two opposite sides of the housing of the saddle.

Figure 6:
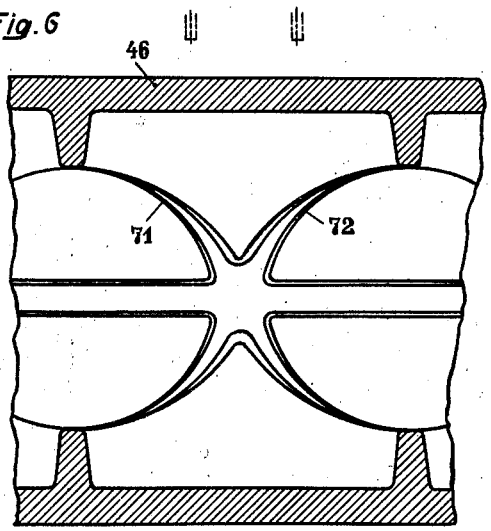

Two embodiments of the invention are diagrammatically illustrated by way of example in the accompanying drawings, in which Figure 1 is a front view, partly in section, of a radial drilling machine of the column type according to the invention;

Fig. 2, a side view, partly in section, of the arm on the housing of the saddle;

Fig. 3, a front view of a radial drilling machine having a rotary jacket;

Fig. 4, a side view, partly in section, of the arm and of the housing of the saddle of the machine shown in Fig. 3;

Fig. 5, a plan view, on a reduced scale, of the arm on the housing of the saddle in the machine shown in Fig. 3; and Fig. 6, a partial section, on an enlarged scale, of the arm shown in Fig. 3.

In the various figures the different possibilities of adjusting the drill spindle are diagrammatically indicated.

The radial drilling machine shown in Fig. 1 comprises a machine bed 1 supporting a column or standard 2 which is longitudinally displaceable. Between a member 3 and the column 2 slewability of the latter about its vertical axis 4 is attained by corresponding bearings or bearing arrangements. To secure the column 2 in position after it has performed a desired motion screws 5 can engage an annular dovetail groove being concentric with the axis 4 and positioned in the member 3. In prismatic guides 6 a slide 7 is vertically movable on the column 2 and provided with a rotary member 8 which can be swung about a shaft 9 and to which a casing 10 is connected. The rotary member 8 has the form of a worm wheel and is in mesh with a worm 11 disposed on the slide 7. The worm 11 is driven by means of an operating lever 12 and a transmission gearing 13, 14, whereby the worm wheel 8 and the casing 10 secured thereto are turned. The casing 10 embraces a bushing 15 provided with a worm toothing 16' and movable about the longitudinal axis of the casing 10 with the aid of an operating lever 16 whose shaft 17 supports a worm gear 18 in mesh with the toothing 16', the shaft 17 being disposed on the casing 10.

In the bushing 15 an arm or tubular carrier 19 is positioned which possesses a toothing 20 by means of which it can be longitudinally displaced within the bushing 15 whilst a groove 21 and a tongue 22 on the bushing 15 prevent rotation thereof. Operation is effected by means of a handle 23 arranged with a pinion 24 on a shaft 25 and in mesh with the toothing 20 of the arm 19. The bearing of the shaft 25 is connected with the bushing 15 and can therefore cooperate in any motion thereof.

As indicated by the positions I and II, the arm 19 can be moved up about the shaft 9 and moved down on the slide 7. Furthermore, independently from these motions the arm 19 may be displaced in longitudinal direction within the bushing 15 to place the drill spindle closer to or farther away from the column 2.

As the arm or tubular carirer 19 is movable within the member 15, displaceable arrangement of the housing 26 of the saddle with its drill spindle 27 on the arm 19 is not required. It is further not necessary that the housing 26 with its portion 28 surrounding the arm 19 should be rotatable about the longitudinal axis of the arm, since this rotary motion for attaining the different positions of the spindle 27, Fig. 2, can be performed by moving the arm 19 within the bushing 15.

With respect to the rotary motions of the drill spindle 27 indicated in Fig. 1 it may be said that the casing portion 28 embracing the arm 19 has a flange 29 provided with a circular dovetail groove 30 which is engaged by guides 31 firmly united with the housing 26 which, together with the drill spindle 27, can therefore be turned in the groove 30 as indicated in Fig. 1.

The hollow arm 19 of circular cross section carries on its left-hand end a motor 32 which drives bevel gears 34, 35, 36 and 37 by means of shaft 33 and intermediate shaft 35'. A shaft 38 connected with the bevel gear 37 drives the drill spindle 27, and the distance between the motor 32 and the spindle 27 remains constant in this case.

To the left and right of the housing 26 of the saddle handles 39 are disposed on a shaft 40 connected with a pinion 41 which is in mesh with a toothing 42 of the drill spindle 27 so as to permit displacement of the spindle within the housing 26 of the saddle.

In the construction shown in Fig. 3 a machine bed 43 supports a conical column 44 provided with a rotary jacket 45. The inner end of the arm 46 is connected with the rotary jacket 45 through a disc 47 and a prismatic guide 48. With the aid of the disc 47 the arm 46 can be turned 360° about its longitudinal axis, the rotation being effected by means of guides 49 connected with the disc 47 and engaging a circular dovetail groove 50 of the guide 48.

The arm 46 is not longitudinally displaceable relative to the rotary jacket 45, but the portion 52 of the housing 51 of the saddle surrounding the arm 46 can be moved to and fro on the arm by means of a handle 53 whose shaft 54 is arranged in the rotary disc 47. A bevel gear 55 disposed on the shaft 54 is in mesh with a bevel gear 56 connected with a threaded spindle 57 provided with nuts 58 which are secured to a guide member 59 moving in a slot of the arm 46 and firmly attached to the housing portion 52. By turning the handle 53 the bevel gears 55, 56 will be caused to drive the threaded spindle 57 fitted with the nuts 58. As the nuts 58 are firmly united with the guide member 59, the housing portion 52 embracing the arm 46 as well as the housing 51 of the saddle will be displaced. The rotary disc 47 is, moreover, arranged on its prismatic guide 48 on the rotary jacket 45 in such manner that the drill spindle 27 together with the arm 46 can be raised and lowered.

The housing 51 of the saddle can also be rotated 360° relative to the housing member 52 with the aid of guides 60 firmly united with the housing 51 and engaging a circular dovetail groove 61 of the housing member 52.

The driving motor 62 for the drill spindle 27 is in this case built into the outer end of the arm 46, and satisfactory driving of the drill spindle 27 is insured by corresponding bevel gearing in spite of the displacement of the housing 51 of the saddle in the direction of the longitudinal axis of the arm 46.

The motor 62 drives bevel gears 64—67 by means of a shaft 63. A shaft 68 connected with the bevel gear 67 drives the drill spindle 27. As the housing 51 of the saddle and the gear members thereof as well as the housing member 52 embracing the arm 46 can be displaced on the latter, the bevel gear 64 on the motor shaft 63 has to be displaced also for which purpose the shaft 68 supporting the bevel gears 64, 65 is embraced by a bushing 69 whose projecting portion 70 engages an annular groove of the bevel gear 64. Handles 39 serve in the manner described for displacing the drill spindle 27 within the housing 51 of the saddle.

Fig. 3 indicates several possibilities of adjusting the housing 51 of the saddle in the groove 61 and thereby the position of the drill spindle 27. Fig. 4 indicates different positions which the drill spindle 27 may occupy according to the rotation of the arm 46 about the disc 47. Fig. 5 shows that the arm 46 can be swung about the axis of the conical column 44 and, by rotation of the arm 46 itself and of the housing 51 of the saddle on the arm, the drill spindle 27 can be adjusted over a wide range.

Fig. 6 is a longitudinal section of a part of the arm 46 and indicates a manner of arranging spiral reinforcing ribs 71, 72 thereon.

What is claimed is:

1. A radial drilling machine comprising a longitudinally adjustable standard rotatable about its longitudinal axis, a tubular carrier mounted for longitudinal movement on said standard, a drill spindle housing oscillatably and rotatably arranged at an end of said carrier, a drive motor mounted in one end of said tubular carrier, a motor shaft therefor coinciding with the longitudinal axis of said carrier, a drill spindle, a drive shaft therefor disposed perpendicularly to the longitudinal axis of said carrier and an intermediate shaft transmitting the drive from said motor shaft to said drill spindle drive shaft.

2. A radial drilling machine comprising a longitudinally adjustable standard rotatable about its longitudinal axis, a tubular carrier mounted for longitudinal movement on said standard, a drill spindle housing oscillatably and rotatably arranged at an end of said carrier, a drive motor mounted in one end of said tubular carrier, a motor shaft therefor coinciding with the longitudinal axis of said carrier, a drill spindle, a drive shaft therefor disposed perpendicularly to the longitudinal axis of said carrier and an intermediate shaft arranged perpendicularly to the longitudinal axis of said carrier transmitting the drive from said motor shaft to said drill spindle drive shaft.

3. A radial drilling machine as set forth in claim 1 in which a guide head is provided for said tubular carrier.

4. A radial drilling machine as set forth in claim 1 wherein the drill spindle housing mounted on said tubular carrier is provided with manual manipulating elements.

5. A radial drilling machine comprising a longitudinally adjustable standard rotatable about its longitudinal axis, a tubular carrier mounted for longitudinal movement on said standard, a drill spindle housing oscillatably and rotatably arranged at an end of said carrier, a drive motor mounted in one end of said tubular carrier, a motor shaft therefor coinciding with the longitudinal axis of said carrier, a drill spindle, a drive shaft therefor disposed perpendicularly to the longitudinal axis of said carrier and an intermediate shaft transmitting the drive from said motor shaft to said drill spindle drive shaft, and bevel gears mounted upon said motor drive shaft, said intermediate shaft and said drill spindle drive shaft for transmitting the drive from said motor drive shaft to said drill spindle drive shaft.

VALENTIN RETTERATH.